United States Patent
Hu et al.

(10) Patent No.: US 12,400,117 B2
(45) Date of Patent: Aug. 26, 2025

(54) PARAMETER-EFFICIENT METHOD FOR TRAINING NEURAL NETWORKS

(71) Applicant: UNIVERSITÄT ZÜRICH, Zürich (CH)

(72) Inventors: Yuhuang Hu, Zürich (CH); Shih-Chii Liu, Zürich (CH)

(73) Assignee: UNIVERSITÄT ZÜRICH, Zürich (CH)

( * ) Notice: Subject to any disclaimer, the term of this patent is extended or adjusted under 35 U.S.C. 154(b) by 595 days.

(21) Appl. No.: 17/960,694

(22) Filed: Oct. 5, 2022

(65) Prior Publication Data

US 2023/0107228 A1 Apr. 6, 2023

(30) Foreign Application Priority Data

Oct. 5, 2021 (EP) .................................... 21201085

(51) Int. Cl.
*G06N 3/08* (2023.01)
*G06N 3/045* (2023.01)
*G06N 3/048* (2023.01)

(52) U.S. Cl.
CPC ............... *G06N 3/08* (2013.01); *G06N 3/045* (2023.01); *G06N 3/048* (2023.01)

(58) Field of Classification Search
CPC .......... G06N 3/08; G06N 3/045; G06N 3/048; G06N 3/09; G06N 3/0464
See application file for complete search history.

(56) References Cited

U.S. PATENT DOCUMENTS

| | | | |
|---|---|---|---|
| 2021/0264271 A1* | 8/2021 | Gebre | G06N 3/082 |
| 2022/0164934 A1* | 5/2022 | Gao | H04N 19/42 |

(Continued)

FOREIGN PATENT DOCUMENTS

CN 113837116 A * 12/2021 ........... G06F 18/214

OTHER PUBLICATIONS

Kingma, Diederik P. "Adam: A method for stochastic optimization." arXiv preprint arXiv:1412.6980 (2014). (Year: 2014).*

(Continued)

*Primary Examiner* — William Spieler
(74) *Attorney, Agent, or Firm* — Maschoff Brennan (57) ABSTRACT

A computer-implemented method is used to adapt a first artificial neural network for data classification tasks. The first artificial neural network is characterized by a first number of first weight parameters, and includes a set of first network layers. The method includes freezing at least some of the first weight parameters of the first neural network to obtain frozen first weight parameters and duplicating the frozen first weight parameters to obtain duplicated first weight parameters. A second artificial neural network is applied to the duplicated first weight parameters to obtain modulated first weight parameters. The second artificial neural network is characterized by a second number of second weight parameters, the second number being smaller than the first number. The frozen first weight parameters are replaced in the first neural network with the modulated first weight parameters to obtain a modulated first artificial neural network adapted for a data classification task.

16 Claims, 6 Drawing Sheets

(56) References Cited

U.S. PATENT DOCUMENTS

2022/0215656 A1\* 7/2022 Dong ..................... G06V 20/17
2024/0103920 A1\* 3/2024 Khayiguian ............ G06F 17/11

OTHER PUBLICATIONS

Donti, Priya, Brandon Amos, and J. Zico Kolter. "Task-based end-to-end model learning in stochastic optimization." Advances in neural information processing systems 30 (2017). (Year: 2017).\*
Xudong, et al., "Context-Gated Convolution," Computer Vision, pp. 701-718 (Dec. 4, 2020).
Zhengjue, et al., "MetaSCI: Scalable and Adaptive Reconstruction for Video Compressive Sensing," CVF Conference on Computer Vision and Pattern Recognition (CVPR), IEEE, pp. 2083-2092 (Jun. 20, 2021).
European Search Report dated Apr. 4, 2022 as received in Application No. 21201085.4.

\* cited by examiner

PARAMETER-EFFICIENT METHOD FOR TRAINING NEURAL NETWORKS

TECHNICAL FIELD

The present invention relates to a method for training neural networks, such as convolutional neural networks. More specifically, the present invention proposes a novel parameter-efficient kernel modulation method that may adapt all parameters of a base network instead of a subset of network layers. These lightweight task-specialised kernel modulators form only a small portion of the base network parameters, and advantageously only the task-specialised kernel modulator weights are communicated and stored on the end-user device possibly together with the base network. The invention equally relates to a neural network configured to carry out the method.

BACKGROUND OF THE INVENTION

Convolutional neural networks have been successfully applied to many computer vision tasks at the expense of over-parameterisation. As the need for fast adaptation and customisation of neural networks grows, the challenge for storing and distributing these large models arises. One common strategy of addressing this challenge is to develop smaller convolutional neural networks, and therefore to reduce the memory requirement of the target platforms. Methods to produce smaller networks include compression of large trained networks, and design of run-time efficient models. However, with the rapid increase of task-specialised networks, maintaining and updating hundreds of these networks will still incur high memory storage cost and energy. In other words, previous methods that train different networks for different tasks are expensive when storing and distributing a great number of networks.

Various methods have been proposed for more optimal training of networks for new tasks as explored in transfer learning and meta-learning scenarios. Because training all parameters requires large training resources, and it requires, in addition, the storage of large parameter sets for multiple networks, parameter-efficient methods avoid fine-tuning of all parameters, instead, they adapt only certain layers of the network. This translates to the memory required only for storing a subset of parameters, which is desirable for sharing these networks. However, methods that train a subset of layers of a base network are typically limited in terms of task adaptation accuracy.

Publication "MetaSCI: Scalable and Adaptive Reconstruction for Video Compressive Sensing" by Zhengjue Wang et al. discloses a Meta Modulated Convolutional Network for snapshot compressive imaging (SCI) reconstruction, which is composed of a shared backbone for different masks, and light-weight meta-modulation parameters to evolve to different modulation parameters for each mask.

Publication "Context-Gated Convolution" by Xudong Lin et al. proposes a context-gated convolution (CGC) to explicitly modify the weights of convolutional layers adaptively under the guidance of global context.

SUMMARY OF THE INVENTION

The objective of the present invention is thus to overcome at least some of the above limitations relating to training neural networks, such as convolutional neural networks, or to adapting them to a specific task.

According to a first aspect of the invention, there is provided a method of adapting a given neural network for a specific data classification task as recited in claim 1.

There is thus proposed a novel parameter-efficient neural network training method, also referred to as a kernel modulation method, which addresses at least some of the above challenges. The proposed kernel modulation method avoids training a large number of parameters in a first neural network, also referred to as a base network, by freezing the weight parameters of the first neural network, and in particular the convolution weights, during task adaptation. Instead, task-specialised lightweight kernel modulators forming a second neural network are trained to produce modulated convolution weights as explained later in more detail. These small kernel modulator networks are much smaller than the base network in terms of the number of weight parameters. The kernel modulator network for task adaptation requires, on average, only a small portion, e.g. 1% to 2% of the base network parameters for each task, which translates to a reduction of 50× to 100× in memory footprint.

To summarise the above advantages, it is possible to store and distribute the lightweight kernel modulators to advantageously fine-tune all or substantially all the parameters of the base network, and storing individual expensive networks can be avoided. Furthermore, the accuracy of the new task adaptation is improved compared to previous methods.

According to a second aspect of the invention, there is provided a computer program product comprising instructions for implementing the steps of the method according to the first aspect of the present invention when loaded and run on a computing apparatus or an electronic device.

According to a third aspect of the invention, there is provided a computing apparatus configured to carry out the method according to the first aspect of the present invention.

Other aspects of the invention are recited in the dependent claims attached hereto.

BRIEF DESCRIPTION OF THE DRAWINGS

Other features and advantages of the invention will become apparent from the following description of a non-limiting example embodiment, with reference to the appended drawings, in which.

DETAILED DESCRIPTION OF AN EMBODIMENT OF THE INVENTION

An embodiment of the present invention will now be described in detail with reference to the attached figures. The present invention proposes a neural network training method that uses one or more kernel modulator networks, or simply kernel modulators, to manage and update a great number of neural network models that are distributed e.g. on consumer devices. Rather than finding and storing multiple networks for different purposes, this invention proposes to use a single base network and repurposes the base network for different tasks using the lightweight, task-specialised kernel modulators. This method first freezes most of the parameters in the base network and then apply layer-wise the kernel modulators that tune the weights for the new task. In this context freezing is understood as an act or operation of holding or being held at a fixed level or in a fixed state. More than 98% of the base networks' parameters can be kept fixed while only the lightweight kernel modulators that constitute fewer than 2% parameters are stored and distributed for individual tasks. The present invention is described in the context of convolutional neural networks, but the teachings of the invention may be applied to other types of neural networks as well. Identical or corresponding functional and structural elements which appear in different drawings are assigned the same reference numerals. It is to be noted that the use of words "first" and "second" may not imply any kind of particular order or hierarchy unless such order or hierarchy is explicitly or implicitly made clear in the context.

Figure 1:
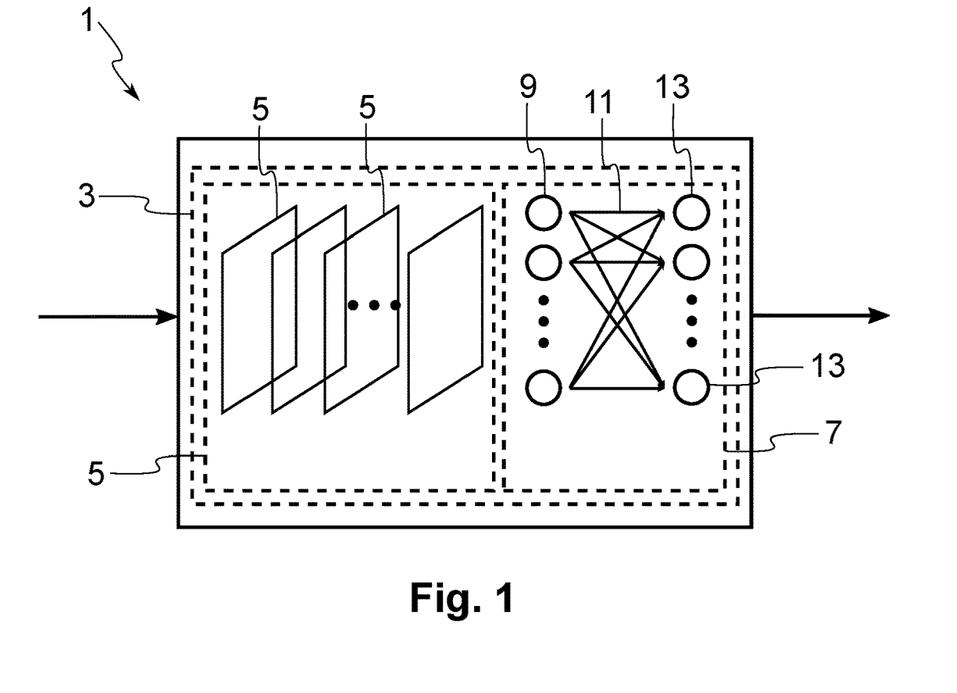
FIG. 1 schematically illustrates a computing apparatus comprising a convolutional neural network that may be trained according to the present invention, the convolutional neural network comprising convolutional layers and one or more classification layers.
Figure 2:
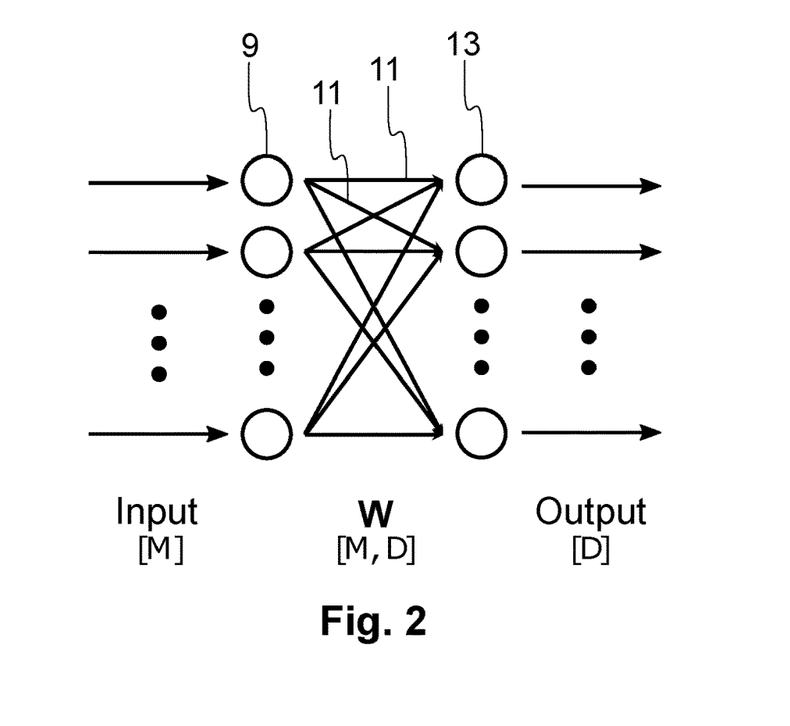
FIG. 2 schematically illustrates one classification layer of the convolutional neural network of FIG. 1 in another view.

FIG. 1 schematically illustrates a computing apparatus 1, such as an end-user device, which may be a handheld device, such as a smart phone, laptop or desktop computer, which may be trained according to the teachings of the present invention. As shown, the computing apparatus 1 comprises a first artificial neural network or a base network, which in this example is a convolutional neural network 3 comprising a first network part, which in this example comprises one or more first network layers, which in this example are convolutional layers 5, and a second network part comprising one or more second network layers, which in this example are classification layers 7. The first and second network parts are in this case arranged in a series configuration. In this example, the computing apparatus comprises a plurality of convolutional layers 5 and one classification layer 7. As shown in FIG. 2, the classification layer comprises a set of artificial input neurons 9 which are connected through classification layer weights 11 to a set of artificial output neurons 13. In FIG. 2, M represents the number of input neurons, while D represents the number of output neurons. The classification layer is a fully connected layer, which in this case means that any given input neuron is connected to all of the output neurons. In the present example, only one classification layer is present, which is formed by the output neurons. It is to be noted that the input neurons do not form a functional layer as the input neurons to do not perform any computational operations. In another example, one or more hidden layers may be present between the input and output neurons. The hidden layers may also be fully connected layers, meaning that any given hidden layer neuron is connected to all of the neurons of a subsequent layer.

Figure 3:
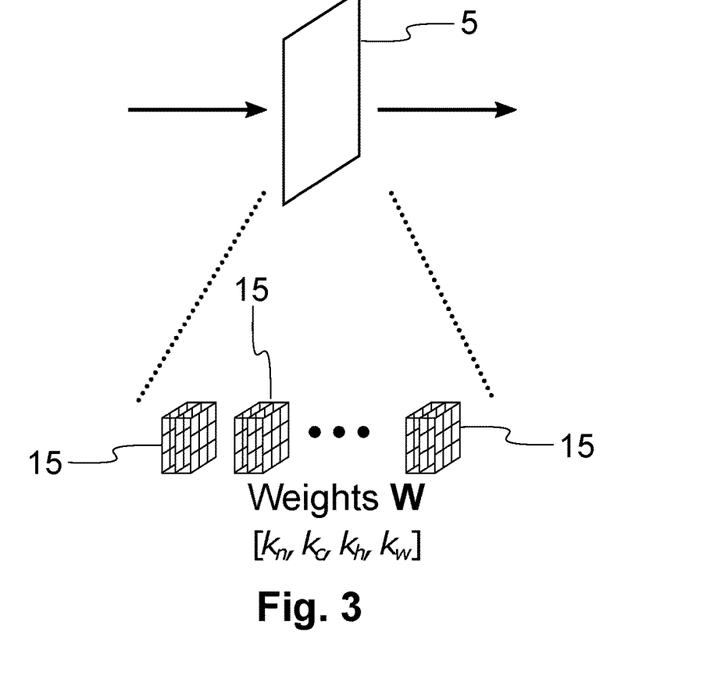
FIG. 3 schematically illustrates one convolutional layer of the convolutional neural network of FIG. 1 in another view.

As shown in FIG. 3, input images or input samples more broadly (schematically illustrated by the arrow on the left-hand side of the convolutional layer 5) are arranged to be processed by each convolutional layer comprising a set of convolutional kernels 15 or filters to output images or output samples more broadly (schematically illustrated by the arrow on the right-hand side of the convolutional layer 5). There are $k_n$ kernels in a given convolutional layer, and each kernel has $k_c$ channels and a spatial dimension $k_h \times k_w$, i.e. the shape or convolutional dimension is ($k_n$, $k_c$, $k_h$, $k_w$). The channels are indicated in the figures by the vertical slices in a given kernel, while each element (shown as a rectangle or square) in a channel of a given kernel illustrates one weight parameter 16 or its value. The number of convolutional layers in the convolutional network may be in the range of 1 to 300, or more specifically between 1 and 150. It was discovered that very good results can be achieved if the number of the convolutional layers is in the range of 30 to 60.

Thus, a convolutional neural network f (i.e. the first artificial neural network) comprises a number of convolutional layers 5 that are parameterised by N weights, $W \in \mathbb{R}^N$. The network takes an input x and outputs y:

$$y = f(x; W) \qquad (1)$$

The first artificial neural network 3 is thus configured to receive input data samples or files, and output data samples or files indicative of results of data classification tasks. Instead of training all weights, for instance, through stochastic gradient descent, we introduce a second artificial neural network, which in this example is a kernel modulator network 17 g that regulates W. The modulator g has K parameters $U \in \mathbb{R}^K$ where K<<N. For example, the value of K is at most 0.5 N, or more specifically at most 0.1 N. It was discovered that a suitable value for K is 0.01 N to 0.02 N. As in the present case there are no biases in the convolutional layers, the word parameter becomes synonymous with weight parameters or simply weights.

$$y = f(x; \tilde{W}); \quad \tilde{W} = g(W; U) \qquad (2)$$

In Equation 2, the kernel modulator g takes W as input and outputs modulated convolution weights $\tilde{W}$. By only training U, kernel modulation avoids training a massive number of weights of the convolutional neural network f.

In the present example, we perform kernel modulation at each convolutional layer $f^{(i)}$ via its own kernel modulator $g^{(i)}$ where (i) is the index of the layer. However, it would instead be possible to apply one single kernel modulator to all of the layers of the convolutional neural network 3. Kernel modulation consists of five main steps (A-E) that are explained below:

A. Let $f^{(i)}$'s convolution weights, $W^{(i)}$, be frozen. In other words, they can be considered as untrainable, at least until later replaced with modulated weights as explained later. The weights in the classification layer(s) are in this present example unfrozen, i.e. they are trainable, although according to some implementations, they could equally be untrainable. There are $k_n$ kernels per convolutional layer. Each kernel has $k_c$ channels and a spatial dimension $k_h \times k_w$, where $k_h$ denotes the kernel height dimension, and $k_w$ denotes the kernel width dimension, i.e. the shape or dimension of the convolution weights for any given layer is ($k_n$, $k_c$, $k_h$, $k_w$).

Figure 4:
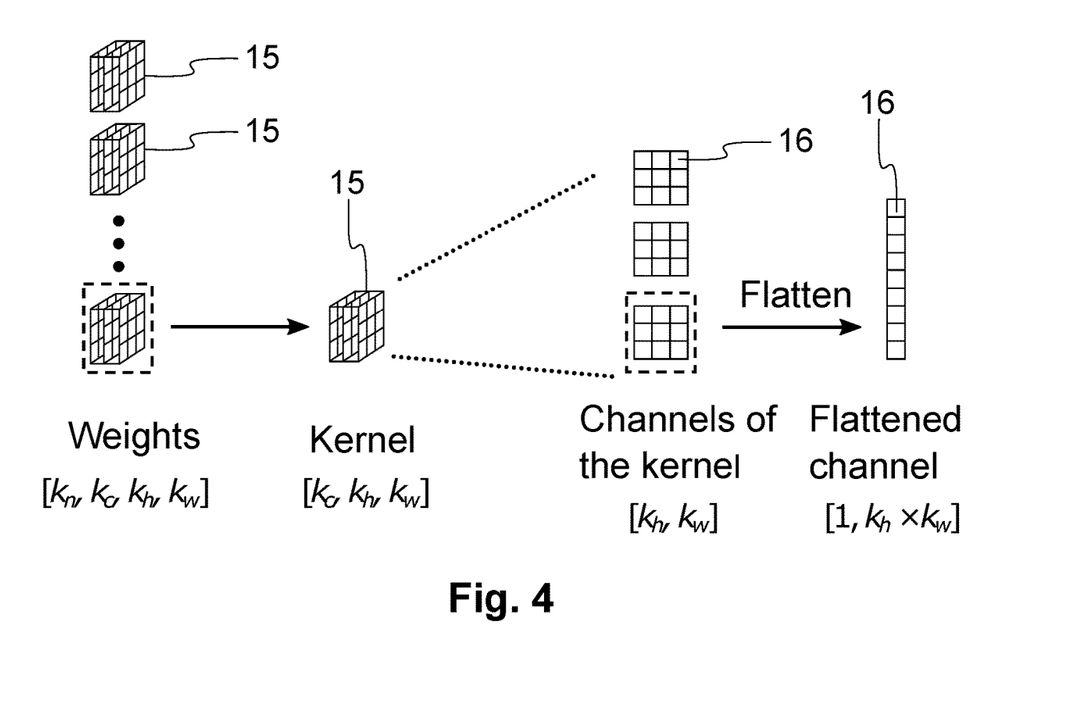
FIG. 4 shows the process of flattening one kernel of the weights of the convolutional layer of FIG. 3.
Figure 5:
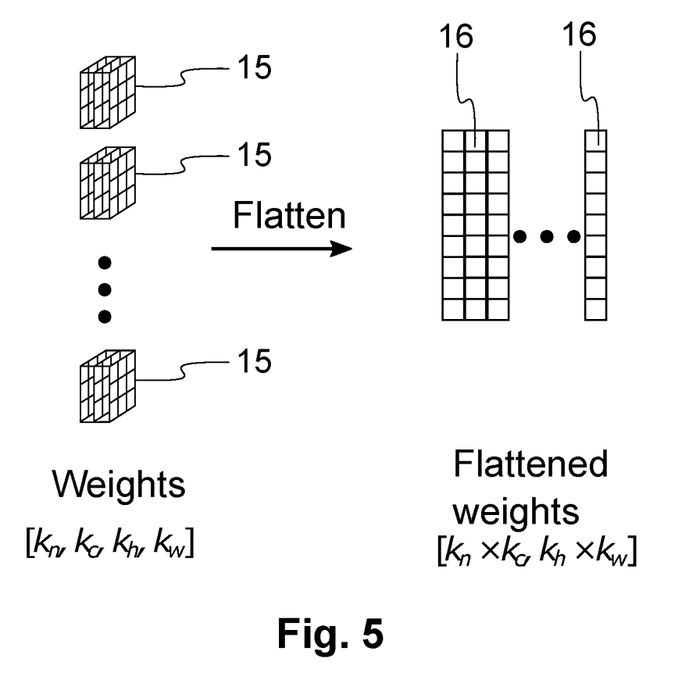
FIG. 5 illustrates the process of flattening a plurality of kernels to obtain flattened weights.

B. We reshape $W^{(i)}$ or their duplicate values from a four-dimensional (4D) tensor to a two-dimensional (2D) tensor in the present example where its dimension is ($k_n \times k_n$, $k_h \times k_w$). In other words, in this step, the dimension of the weights is reduced by combining weights together, channel by channel and kernel by kernel. In this concrete example, the dimension of the convolution weights is reshaped from (32, 16, 3, 3) to (512, 9). This operation is illustrated in FIGS. 4 and 5, where for simplicity, the number of channels k, equals 3, $k_h$=3, and $k_w$=3.

Figure 6:
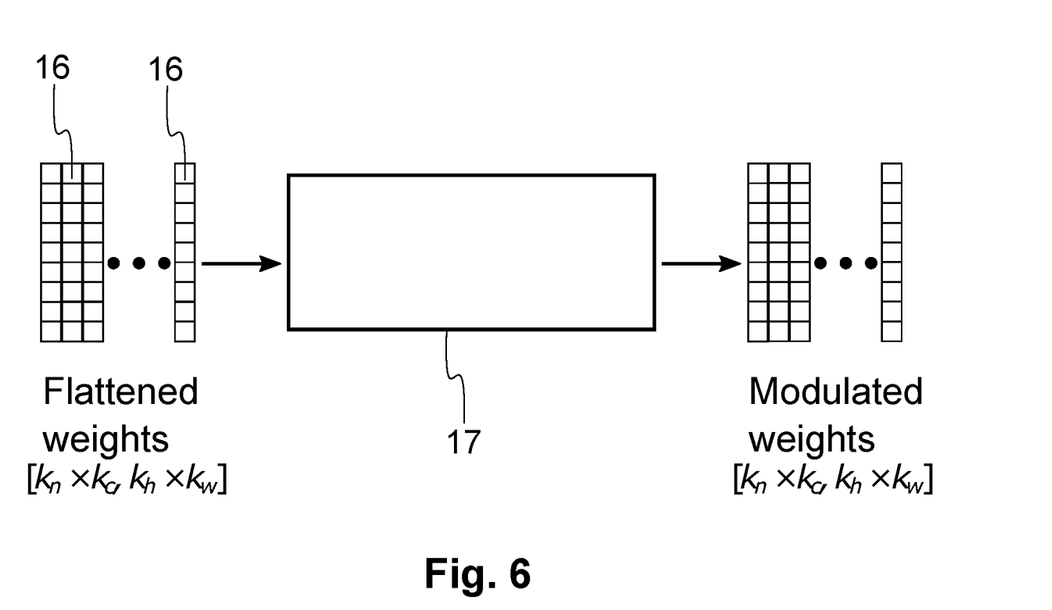
FIG. 6 schematically illustrates the process of applying a kernel modulator to flattened weights to obtain modulated weights.
Figure 7:
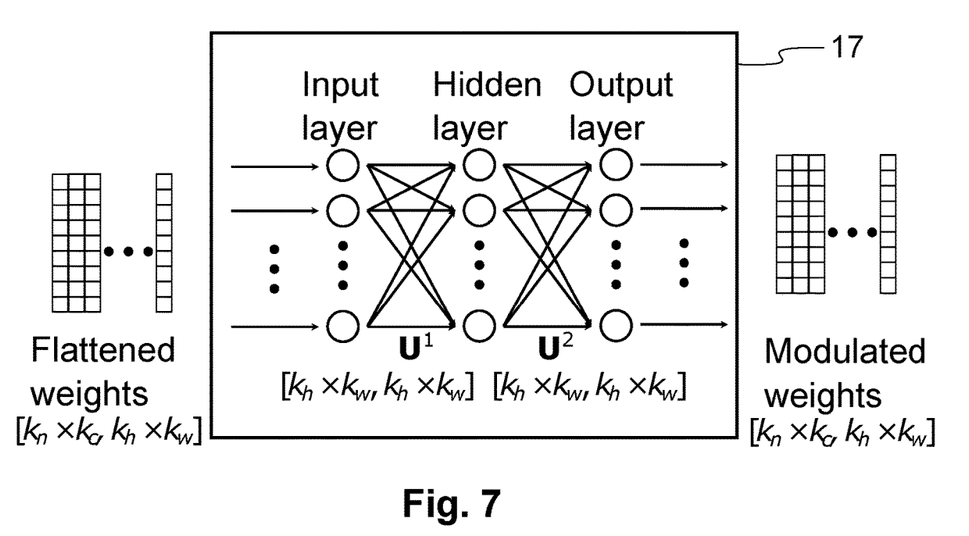
FIG. 7 schematically illustrates the process of applying the kernel modulator to the flattened weights to obtain the modulated weights in another view.

C. The corresponding kernel modulator $g^{(i)}$ is in the present example implemented as a multilayer perceptron (MLP) network, and in this case as a 2-layer MLP network, that has both $k_h \times k_w$ inputs and outputs. $g^{(i)}$'s parameters, $U^{(i)}$, are trainable. The layers of the kernel modulator are also referred to as third network layers. This is illustrated in FIGS. 6 and 7. A shallow kernel modulator, e.g. one or two layers, is sufficient for reaching good accuracy.

D. The network $g^{(i)}$ takes WCM as input, and more specifically the flattened version of $W^{(i)}$ and returns modulated weights $\tilde{W}^{(i)}$ as is further illustrated in FIGS. 6 and 7.

Figure 8:
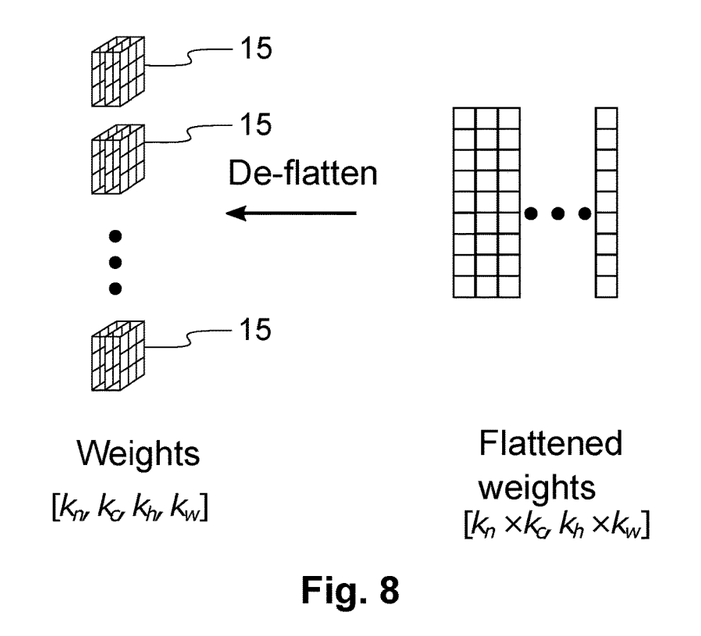
FIG. 8 illustrates the process of de-flattening the modulated, flattened weights.

E. The modulated weights $\tilde{W}^{(i)}$ are reshaped back to its original shape ($k_n$, $k_e$, $k_h$, $k_w$). In other words, the modulated weights are de-flattened as shown in FIG. 8.

The modulated weights $\tilde{W}^{(i)}$ are used in the convolutional layer $f^{(i)}$ for transforming the input $x^{(i)}$ into its output $y^{(i)}$, where different convolutional layers have typically different weight values:

$$y^{(i)}=f^{(i)}(x^{(i)};\tilde{W}^{(i)});\tilde{W}^{(i)}=g^{(i)}(W^{(i)};U^{(i)}) \quad (3)$$

It is to be noted that according to the present example, only the kernel modulator's weights $U^{(i)}$ and optionally the weights of the classification layer(s) are trainable. In the above scenario, compared to training 4.6K (32×16×3×3) convolution weights, the present method may only train 162 or approximately 162 parameters of the kernel modulator 17 (~28× reduction).

The kernel modulator initialisation is explained in the following. The kernel modulator $g^{(i)}$ is in this specific example a 2-layer MLP network that uses the tan h activation function. Each layer's weight is in this case initialised as $$U^{(i,j)}=I+\mathcal{N}(0,0.001); j=1,2, \quad (4)$$

where $U^{(i,j)}$ denotes the weights of the j-th hidden layer of $g^{(i)}$, I is the identity matrix (diagonal values equaling 1, while other values are set to 0); $\mathcal{N}(\mu, \sigma)$ is a normal distribution with $\mu$=0 and $\sigma$=0.001. The present example uses the tan h activation function and the initialisation method in Equation 4 to preserve the convolution weight values before modulation. However, other initialisation methods could instead be used, which would advantageously similarly keep the weight values. After training, the kernel modulator g is used to regulate the original convolution weights.

The default activation function tan h is a symmetric function that allows both positive and negative outputs. However, other activation functions may instead be used, namely other symmetric activation functions, such as sin and the identity function, or asymmetric functions, such as leaky rectified linear unit (ReLU) and ReLU functions.

Figure 9:
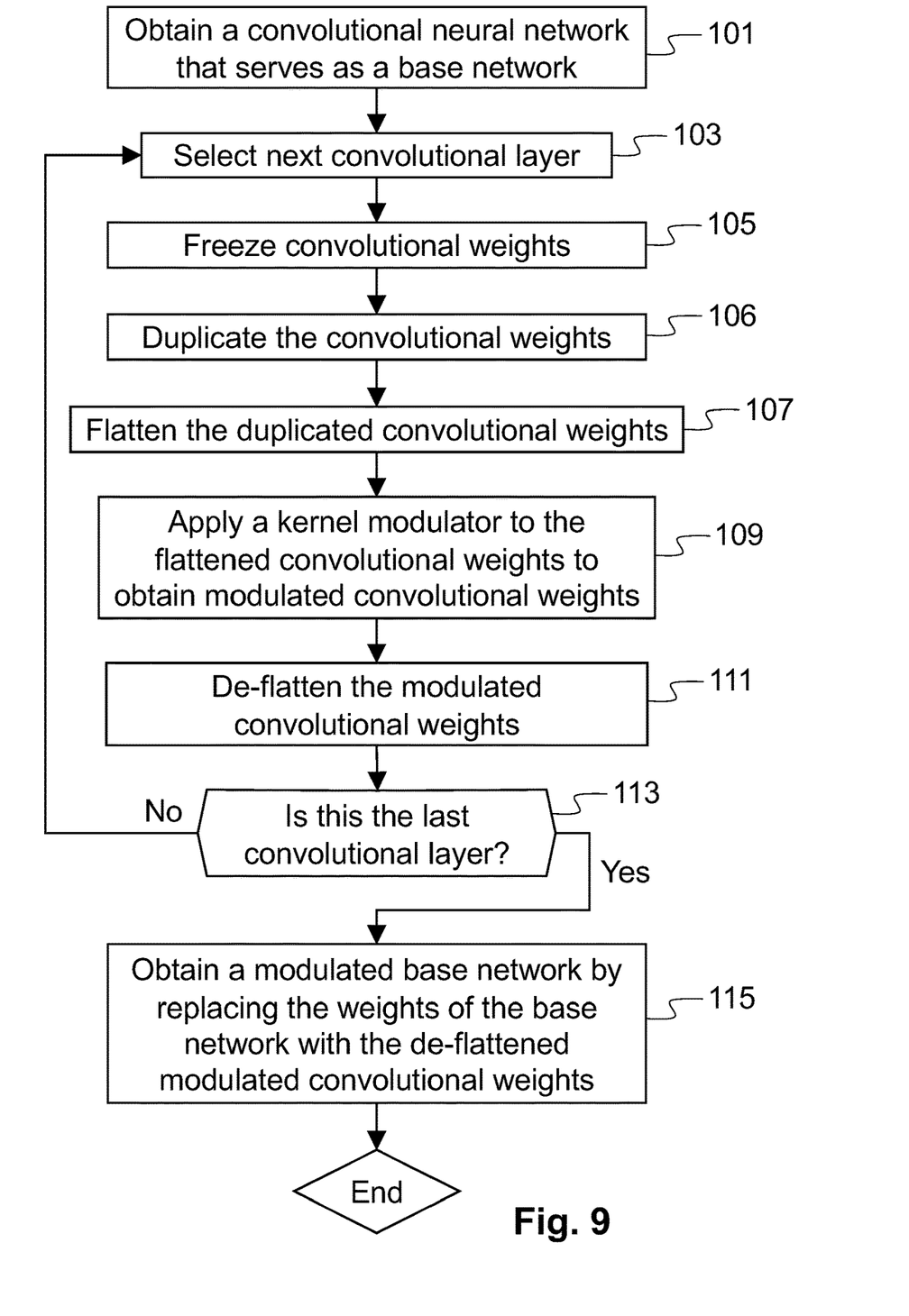
FIG. 9 is a flow chart illustrating a kernel modulation method according to an example of the present invention.

The kernel modulation method is next explained with reference to the flowchart of FIG. 9. In step 101, a convolutional neural network 3 is obtained or generated. This network is configured to operate as a base network, and it is characterised by, or it consists of a first number of first weight parameters. In step 103, the next convolutional layer 5 is selected. As the convolutional layers are arranged in a given order or sequence, this means that different convolutional layers can be treated sequentially. In step 105, the convolution weights of the selected layer are fixed or frozen to obtain frozen convolution weights. In fact, in this step, the convolution weights of a plurality of or all of the convolutional layers may be frozen. This means that their values in the base network are fixed until they are later replaced with new values as explained later. These weights are thus not trained. In step 106, the frozen convolution weights or their values are duplicated to obtain duplicated convolution weights, which may be considered to be unfrozen. In step 107, the duplicated convolution weights or their values of the selected layer are processed or reshaped. More specifically, the convolution weights of the selected layer are flattened following the principles explained above.

In step 109, a kernel modulator 17 is applied to the flattened weights or the flattened weights are applied to the kernel modulator. As a result, modulated weights are obtained. The modulated weights are also flattened. In other words, the modulated, flattened weights have the same shape as the flattened, unmodulated weights. The kernel modulator is characterised by, or it consists of a second number of second weight parameters, where the second number is smaller than the first number. It is to be noted that prior to carrying out step 109, the kernel modulator has been trained for a given data classification task by using a training data set, which comprises at least one data sample. A respective sample of the data set comprises an input vector and an output prediction vector. Stochastic gradient descent may be used as a training algorithm that optimises a predefined loss function. In step 111, the modulated weights are processed. More specifically, the modulated weights are de-flattened so that they now have the same shape as the frozen convolution weights. In this example, the flattened weight parameters form two-dimensional sample files with a given number of rows and a given number of columns. The number of columns per sample file of a respective convolutional layer 5 equals the number of kernels 15 in the respective convolutional layer multiplied by the number of channels in a respective kernel 15, while the number of rows per sample file of the respective convolutional layer equals a kernel height dimension multiplied by a kernel width dimension. Alternatively, the number of rows per sample file of a respective convolutional layer 5 equals the number of kernels 15 in the respective convolutional layer multiplied by the number of channels in a respective kernel 15, while the number of columns per sample file of the respective convolutional layer equals a kernel height dimension multiplied by a kernel width dimension. In step 113, it is determined whether or not the present convolutional layer 5 is the last convolutional layer in the base network. If it is determined that there are still one or more convolutional layers left in the base network, then the process continues in step 103. In other words, according to this example, the kernel modulator is applied to all convolutional layers. If on the other hand it is determined that the present convolutional layer is the last layer, and that all the layers have been treated, then in step 115, a modulated base network is obtained by replacing the frozen weights of the base network with the de-flattened modulated convolutional weights. This means that in this example all the weight values of all the convolutional layers are replaced with new, modulated weight values. The modulated base network is now ready to be used to solve a desired task.

Figure 10:
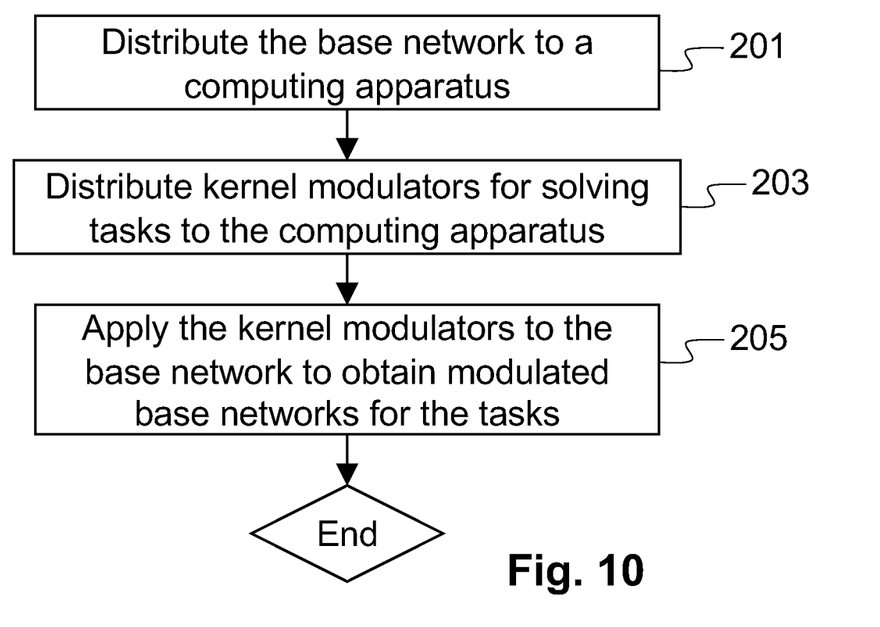
FIG. 10 is a flow chart illustrating a method of distributing kernel modulators according to an example of the present invention.

The flowchart of FIG. 10 summarises the process of distributing one or more kernel modulators to a computing apparatus 1 and the subsequent adaptation of the base network. In step 201, the base network is distributed to the computing apparatus. The base network is characterised by its weights. Some, most or all of them are frozen until replaced with modulated weights. In step 203, one or more kernel modulators 17 are distributed to the computing apparatus for solving one or more computing tasks. In step 205, the one or more kernel modulators 17 are applied to the base network to obtain one or more modulated base networks for solving the one or more computing tasks. This step may involve carrying out steps 103 to 115 of the flowchart of FIG. 9 for each one of the kernel modulators. Thus, once this step has been completed, the number of the modulated base networks equals the number of the kernel modulators that are available for the computing tasks.

The present invention introduced a kernel modulation method, a parameter-efficient training method. Instead of training all weights of a convolutional neural network, it is possible to train only light-weight kernel modulators. The proposed method offers an economical strategy for training and deploying personalised neural networks to meet the fast-growing need for network solutions. For example, distributing one hundred task-specialised residual neural networks that are 50 layers deep for one hundred tasks would require 100 tasks×94 MB/task-specialised network=9400 MB for the network weights. Each network update via the proposed kernel modulation method constitutes on average, 1.4% of parameters for one task. Therefore, in this example, the memory requirement would be reduced to 94 MB+100 tasks×94 MB/task-specialised network×1.4%=226 MB, a 43× memory reduction.

It was discovered that using a shallow kernel modulator network, a symmetric, non-linear activation function and the default initialisation is a good starting point for using the kernel modulation method also in other data classifications scenarios as the one explained above. In the above example, the kernel modulator treats weight channels as independent inputs. Thus, neighbouring weight channels are not utilised to determine the modulated weights. However, the above example method may be modified for example so that the MLP network is replaced with other candidates that use neighbouring weight channels.

To conclude, the present invention proposes using kernel modulators for neural network adaptation. Kernel modulation facilitates and promotes cost-efficient on-device convolutional neural network deployment by reducing the memory footprint when distributing task-specialised networks.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims. Further embodiments may be obtained by combining any of the teachings above.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A computer-implemented method of adapting a first artificial neural network for one or more data classification tasks, the first artificial neural network being characterised by a first number of first weight parameters, and comprising a set of first network layers, the first artificial neural network being configured to receive input data samples, and output data samples indicative of results of data classification tasks, the method comprising the steps of:

freezing at least some of the first weight parameters of the first artificial neural network to obtain frozen first weight parameters;

duplicating the frozen first weight parameters to obtain duplicated first weight parameters;

applying a second artificial neural network to the duplicated first weight parameters to obtain modulated first weight parameters, the second artificial neural network being characterised by a second number of second weight parameters, the second number being smaller than the first number; and replacing the frozen first weight parameters in the first artificial neural network with the modulated first weight parameters to obtain a modulated first artificial neural network adapted for a given data classification task, wherein the method further comprises training the second artificial neural network with a task-specific training data set prior to applying the second artificial neural network to the duplicated first weight parameters.

2. The method according to claim 1, wherein the method further comprises providing a computing apparatus with the first artificial neural network, and with one or more of the second artificial neural networks, and carrying out the steps of claim 1 on the computing apparatus.

3. The method according to claim 1, wherein the first artificial neural network is a convolutional neural network, wherein the first network layers are convolutional layers and the frozen first weight parameters are convolution weights, and wherein the first artificial neural network comprises a set of second network layers comprising one or more classification layers.

4. The method according to claim 3, wherein all the convolution weights of all the convolutional layers of the first artificial neural network are frozen and untrainable.

5. The method according to claim 1, wherein the second artificial neural network comprises a set of third layers, which are fully connected layers.

6. The method according to claim 1, wherein the second artificial neural network comprises a set of non-linear activation functions.

7. The method according to claim 1, wherein the number of the frozen first weight parameters equals the number of the modulated first weight parameters.

8. The method according to claim 1, wherein the second artificial neural network comprises a multilayer perceptron network.

9. The method according to claim 1, wherein the second artificial neural network is applied to the duplicated first weight parameters layer-wise such that the second artificial neural network is applied to the duplicated first weight parameters of a respective first network layer before applying the second artificial neural network to the duplicated first weight parameters of a subsequent first network layer.

10. The method according to claim 1, wherein the frozen first weight parameters are arranged in kernels in the first artificial neural network so that a respective kernel comprises a given number of channels with a given spatial dimension, and wherein the method further comprises flattening the duplicated first weight parameters to obtain flattened first weight parameters, and applying the second artificial neural network to the flattened first weight parameters.

11. The method according to claim 10, wherein the flattened first weight parameters form two-dimensional sample files with a given number of rows and a given number of columns, wherein the number of columns per sample file of a respective first network layer equals the number of kernels in the respective first network layer multiplied by the number of channels in a respective kernel, while the number of rows per sample file of the respective first network layer equals a kernel height dimension multiplied by a kernel width dimension, or vice versa.

12. The method according to claim 10, wherein the method further comprises de-flattening the modulated first weight parameters prior to replacing the frozen first weight parameters with the modulated first weight parameters.

13. The method according to claim 1, wherein the second number is denoted by K, and the first number is denoted by N, and wherein K equals at most 0.5×N.

14. The method according to claim 1, wherein the method further comprises initialising the second artificial neural network with an initialisation function which is the sum of an identity matrix and a matrix in which the entries are drawn from a zero-mean Gaussian distribution.

15. A computer program product comprising instructions for implementing the steps of the method according to claim 1 when loaded and run on an electronic device.

16. A computing apparatus for adapting a first artificial neural network for one or more data classification tasks, the first artificial neural network being characterised by a first number of first weight parameters, and comprising a set of first network layers, the first artificial neural network being configured to receive input data samples, and output data samples indicative of results of data classification tasks, the computing apparatus being configured to perform operations comprising:
  freeze at least some of the first weight parameters of the first artificial neural network to obtain frozen first weight parameters;
  duplicate the frozen first weight parameters to obtain duplicated first weight parameters;
  apply a second artificial neural network to the duplicated first weight parameters to obtain modulated first weight parameters, the second artificial neural network being characterised by a second number of second weight parameters, the second number being smaller than the first number; and
  replace the frozen first weight parameters in the first artificial neural network with the modulated first weight parameters to obtain a modulated first artificial neural network adapted for a given data classification task,
  wherein the computing apparatus is further configured to train the second artificial neural network with a task-specific training data set prior to applying the second artificial neural network to the duplicated first weight parameters.

* * * * *